(12) United States Patent
Soehnel

(10) Patent No.: US 7,067,994 B2
(45) Date of Patent: Jun. 27, 2006

(54) ELECTRONIC BALLAST WITH OVERVOLTAGE MONITORING

(75) Inventor: Christian Soehnel, Altach (AT)

(73) Assignee: TridonicAtco GmbH & Co. KG, Dornbirn (AT)

(*) Notice: Subject to any disclaimer, the term of this patent is extended or adjusted under 35 U.S.C. 154(b) by 7 days.

(21) Appl. No.: 10/870,063

(22) Filed: Jun. 18, 2004

(65) Prior Publication Data
US 2005/0012472 A1 Jan. 20, 2005

Related U.S. Application Data

(63) Continuation of application No. PCT/EP02/11422, filed on Oct. 11, 2002.

(30) Foreign Application Priority Data
Dec. 20, 2001 (DE) .............................. 101 63 034

(51) Int. Cl.
*H05B 37/02* (2006.01)
*H01J 1/60* (2006.01)

(52) U.S. Cl. ...................................... 315/308; 315/129

(58) Field of Classification Search ............ 315/200 R, 315/209 R, 224–226, 291, 307, 308, DIG. 2, 315/DIG. 5, DIG. 7, 129, 134–135
See application file for complete search history.

(56) References Cited

U.S. PATENT DOCUMENTS 4,992,718 A * 2/1991 Kumaki ....................... 318/768
5,122,726 A * 6/1992 Elliott et al. ................. 323/272
5,446,342 A * 8/1995 Nilssen ........................ 315/129
5,563,477 A 10/1996 Ribarich et al. ............. 315/307
6,400,095 B1 * 6/2002 Primisser et al. ........... 315/224

FOREIGN PATENT DOCUMENTS

| DE | 10013279 A | 9/2001 |
|---|---|---|
| EP | 0411618 A | 2/1991 |
| EP | 0450728 A | 10/1991 |
| EP | 0677982 A | 10/1995 |
| JP | 402164223 A * | 6/1990 |
| WO | WO 98/47324 | 10/1998 |
| WO | WO 00/69044 | 11/2000 |

* cited by examiner

*Primary Examiner*—Thuy Vinh Tran
(74) *Attorney, Agent, or Firm*—Fitzpatrick, Cella, Harper & Scinto

(57) ABSTRACT

An electronic ballast for at least one gas discharge lamp (LA), preferably for a fluorescent tube, having a rectifier circuit (2) connectable to a supply voltage source, a smoothing circuit (3) connected to the output of the rectifier circuit (2) for generating an intermediate circuit voltage (UZ), and an inverter (4), fed with the intermediate circuit voltage (UZ), to the output of which a terminal for the load circuit (5) containing the lamp (LA) is connected, and an overvoltage monitoring device which monitors the supply voltage (U0) delivered to the electronic ballast, whereby in the event that the supply voltage exceeds a predetermined nominal value (Ui,max), an optically or acoustically perceptible warning signal is issued.

12 Claims, 1 Drawing Sheet

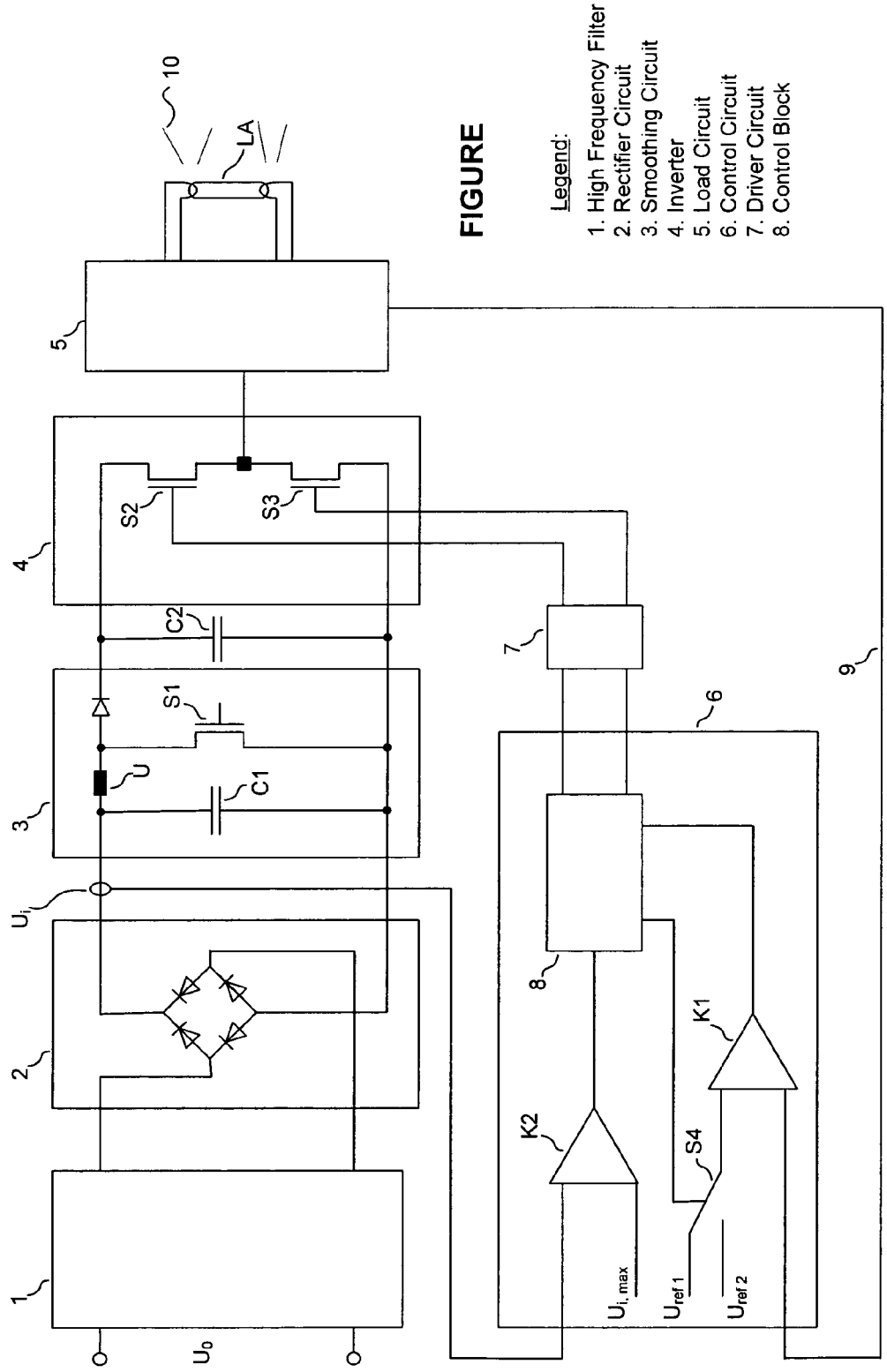

US 7,067,994 B2

ELECTRONIC BALLAST WITH OVERVOLTAGE MONITORING

CROSS REFERENCE TO RELATED APPLICATONS

This is a Continuation of International Application PCT/EP02/11422 filed on Oct. 11, 2002, which was published on Jul. 3, 2003 in German, but not English, as WO 03/055281 A1, the priority of which is hereby claimed and which claims the priority of German application 101 63 034.4 filed Dec. 20, 2001, the priority of which is also claimed herein.

BACKGROUND OF THE INVENTION

1. Field of the Invention

The present invention relates to an electronic ballast for the operation of at least one gas discharge lamp.

2. Description of the Related Art

If a plurality of electronic ballasts for the operation of gas discharge lamps are wired together to form a larger illumination system, normally the phase terminals and the neutral lines of the ballasts are first connected with one another and then connected to the mains. If the common connection of the neutral lines of the ballasts is not or is only insufficiently connected with the mains neutral line, or other faults arise in the wiring, there can arise at the ballasts an undefined voltage condition, with the consequence that the voltages lie above the normal supply voltage in the region between 220 and 380 volts.

This overvoltage brings with it the danger that the apparatuses could be destroyed if the causes of the faulty wiring are not removed in a timely manner. Although there would be the possibility of so configuring the ballasts that they self-actingly compensate the overvoltage, through this however a not inconsiderable amount of power would be consumed to no end. For this reason, the ballasts are as a rule so configured that in the event of overvoltages they work for at least a limited period of time. In this case, however, there is then necessary a recognition of the overvoltage condition at the earliest possible time, in order to be able to take suitable steps.

The present invention is thus based on the object of so configuring an electronic ballast for the operation of at least one gas discharge lamp that it makes possible a recognition of fault conditions in the voltage supply.

This object is achieved by means of an electronic ballast which has an overvoltage monitoring device, which monitors the supply voltage delivered to the electronic ballast and, in the event that the supply voltage exceeds a predetermined nominal value, initiates an optically or acoustically perceptible warning signal. The ballast is thus itself not in a position to act to counter the overvoltage. Instead of this it is ensured that the fault in the voltage supply is indicated directly after the switching on of the lamp, so that appropriate measures can be taken to remove the overvoltage. By means of the measures in accordance with the invention the operational security of the ballast is thus significantly increased.

Further developments of the invention are also described and claimed herein. For example, an input signal is delivered to the overvoltage monitoring device. This input signal preferably may be the supply voltage rectified by a rectifier circuit on an input side of the ballast. The detected signal is then compared, with the aid of a comparator, with a nominal value. Alternatively to a simple comparator, there may, however, also be provided an analogue/digital converter, which converts the detected measurement value into a digital value consisting of at least two bits, through which the exactitude of the overvoltage monitoring is increased.

Preferably, upon recognition of an overvoltage condition, the overvoltage monitoring device sends a corresponding signal to a control circuit which is provided for the control of the inverter of the ballast, whereby the control circuit, as reaction to the received overvoltage signal, periodically switches the lamp on and off or periodically modulates the brightness of the lamp. A particularly elegant development of the invention consists in generating the periodic brightness variation of the lamp in that the regulation circuit for the operation of the inverter is influenced. For example, if the control circuit detects an operating parameter of the load circuit, compares this with a reference value, and generates in dependence upon the comparison result control signals for controlling the inverter, it can thus be provided that the reference value of the regulation circuit is periodically altered. Through the alteration of the reference value, the lamp is automatically operated with a modulated brightness, without particular measures being necessary for this purpose.

A further development of the invention incorporates a digital regulation circuit. This involves providing, in the control circuit, an analogue/digital converter for converting the detected operating parameter of the load circuit into a digital value consisting of at least two bits, whereby the control circuit calculates on the basis of this digital value, in a digital regulation circuit, switching information for the operation of the inverter and passes this on to a driver circuit which converts the switching information into corresponding control signals for the operation of the inverter. The analogue/digital converter may then operate in time multiplex mode and be employed at regular intervals also for the detection and the evaluation of the supply voltage. This variant makes possible an integration of the overall ballast to the greatest possible extent, since the components of the control circuit are integrated into a single circuit and at the same time can be used also for realisation of the overvoltage monitoring. In particular it can be provided that the control circuit is constituted as an application specific integrated circuit (ASIC).

BRIEF DESCRIPTION OF THE DRAWING

In the following, the invention will be explained in more detail with the reference to the accompanying drawing, which schematically illustrates an electronic ballast in accordance with the invention.

DETAILED DESCRIPTION OF THE PREFERRED EMBODIMENT

The ballast illustrated in the single FIGURE is connected on the input side to the mains voltage supply U0 via a high frequency filter 1. At the output of the high frequency filter 1 there is a rectifier circuit 2 in the form of a full-bridge rectifier, which converts the mains supply voltage U0 into a rectified input voltage Ui for a smoothing circuit 3. the smoothing circuit 3 serves for filtering harmonics and smoothing the input voltage Ui and includes a smoothing capacitor C1 and a step-up device having an inductance L1, a controllable switch in the form of a MOS field effect transistor S1 and a diode D1. In place of the step-up unit, also other known smoothing circuits can be employed.

By means of an appropriate switching of the MOS field effect transistor S1 there is generated an intermediate circuit voltage applied via the storage capacitor C2 following the smoothing circuit 3, which intermediate circuit voltage is supplied to the inverter 4. This inverter 4 is constituted by two MOS field effect transistors S2 and S3 arranged in a half-bridge arrangement. By means of an alternating high frequency control of the two field effect transistors S2, S3 there is generated at the middle point of the half-bridge an a.c. voltage which is delivered to the load circuit with the gas discharge lamp LA connected thereto. This operation of the lamp LA—which may be in particular a fluorescent lamp—with a high frequency voltage is already sufficiently well known and thus in the following is not further explained.

The control of the MOS field effect transistor S1 of the smoothing circuit 3 is effected by means of a non-illustrated control unit; the control of the two MOS field effect transistors S2 and S3 of the inverter 4 by means of the control circuit 6. This generates appropriate switching information and sends this to a driver circuit 7 connected to the control circuit 6. The driver circuit 7 in turn transforms the switching information into appropriate control signals and sends these to the gates of the two MOS field effect transistors S2, S3. The generation of the control information is thereby effected taking into account an operating parameter taken from the load circuit 5, which is delivered to the control circuit 6 via an input line 9. This operating parameter may for example be the lamp voltage, the lamp current or the lamp power.

The signal taken from the load circuit 5 is delivered to a comparison circuit K1 within the control circuit 6, which comparison circuit compares this signal with a reference value applied to a second input of the comparison circuit K1. The reference value may thereby be selected with the aid of the switch S4 from two different reference values Uref1 and Uref2, which will be explained in more detail below. The comparison result determined by the comparison circuit K1 is delivered to a control block 8 which in dependence upon this comparison result generates the control information for the inverter 4 and sends it to the driver circuit 7.

Preferably the just described regulation circuit is constituted digitally. This means that the comparison circuit K1 is a digital comparator which converts the signal delivered via the input line 9 into a digital value having a precision of at least two bits, preferably of 12 bits, and sends a corresponding digital output signal to the control block 8. This control block 8 likewise functions digitally and calculates on the basis of the value received from the comparison circuit K1 the control information suitable for the lamp operation. The advantage of this digital configuration consists in that the control circuit 6 can kept very compact. Through the transformation into digital values with a high precision there is further ensured a stable regulation. There is however also the possibility to provide the regulation circuit illustrated here in analog form.

Below, the overvoltage monitoring in accordance with the invention will explained. For this purpose there is sent to a further comparator circuit K2, arranged in the control circuit 6 and constituted as a comparator, an input signal characterising the supply voltage U0. In the illustrated example for this purpose there is detected the rectified supply voltage from the rectifier 2, which constitutes the input voltage Ui for the smoothing circuit 3.

The second comparator circuit K2 compares the input signal Ui with a nominal value Ui,max and in this way determines whether the supply voltage U0 lies outside a permissible range. If this is the case it directs a corresponding overvoltage signal to the control block 8 which as a consequence thereof alternately switches the switch S4 via which the reference value for the first comparator circuit K1 of the regulation circuit for the inverter 4 is selected. In this way there is delivered to the comparison circuit K1 a periodically changing reference value. As a consequence thereof the actual value of the regulation circuit for the inverter 4 changes, so that the lamp LA is periodically operated with different power and correspondingly alters its brightness. This expresses itself in a flickering of the lamp (e.g., the lamp indicates a warning signal 10, which in this example is optical) which can be immediately recognised by an installer upon bringing into operation of the ballast, and can be interpreted as the presence of a wiring fault so that before damage to the ballast due to the overvoltage suitable steps can be taken.

The circuit variant illustrated here, for monitoring the voltage supply and display of an overvoltage condition, distinguishes itself through its simple structure and the fact that for this only a few components are necessary. The comparator circuit K2 may thereby be provided in analog and also in digital form. An advantageous further development may also consist in operating the analogue/digital converter for the regulation circuit of the inverter 4 in time multiplex and to employ it at regular intervals for the monitoring of the supply voltage U0. In this case, the overvoltage monitoring in accordance with the invention can be realised even without a single additional component. Of course, there is however the possibility of constituting the entire circuit in analog form.

A variant of the illustrated exemplary embodiment can consist in issuing an acoustic warning signal instead of an optically perceptible signal, as soon as an overvoltage condition is recognised. In both cases the operational security is significantly increased, since the presence of an overvoltage condition can be recognised at an early stage and further damage to the ballast can be avoided.

The invention claimed is:

1. An electronic ballast for at least one gas discharge lamp, said ballast comprising:
    a rectifier circuit connected to a supply voltage source;
    a smoothing circuit connected to an output of the rectifier circuit for generating an intermediate circuit voltage;
    an inverter, arranged to be fed with the intermediate circuit voltage, an output of which is connected to a terminal of a load circuit containing a lamp; and
    a control circuit including an overvoltage monitoring device, the overvoltage monitoring device being configured to monitor the supply voltage delivered to the load circuit and, in the event that said supply voltage exceeds a predetermined nominal value, to initiate an optical or acoustical warning signal.

2. An electronic ballast according to claim 1,
    wherein the supply voltage rectified by the rectifier circuit is an input signal of the overvoltage monitoring device.

3. An electronic ballast according to claim 1,
    further comprising a comparator for comparing a measurement signal detected by the overvoltage monitoring device with the nominal value.

4. An electronic ballast according to claim 1,
    further comprising an analog/digital converter for converting a measurement signal detected by the overvoltage monitoring device into a digital value of at least two bits, and for comparing it with the nominal value.

5. An electronic ballast according to claim 4,
    wherein the control circuit has a single analog/digital converter, working in time multiplex, for converting a detected operating parameter and the measurement signal detected by the overvoltage monitoring device.

6. An electronic ballast according to claim 4,
wherein the analog/digital converter converts a detected operating parameter or measurement values into digital values having a precision of 12 bits.

7. An electronic ballast according to claim 1,
wherein the overvoltage monitoring device is configured to send, in a case that a measurement signal exceeds the nominal value, an overvoltage signal to a part of the control circuit for operating the inverter, which as reaction to the overvoltage signal periodically switches the lamp on and off or modulates the brightness of the lamp.

8. An electronic ballast according to claim 7,
wherein the control circuit is connected and configured to detect at least one operating parameter of the load circuit to compare the operating parameter with a reference value and, in dependence upon the comparison result, to generate control signals for controlling the inverter, whereby the reference value is periodically altered upon receipt of the overvoltage signal.

9. An electronic ballast according to claim 7,
wherein the control circuit has an analog/digital converter for converting a detected operating parameter of the load circuit into a digital value of at least two bits, and, on the basis of this digital value, to calculate in a digital control block, switching information for operating the inverter and sending the switching information to a driver circuit which transforms the switching information into a corresponding control signal for controlling the inverter.

10. An electronic ballast according to claim 9, wherein the control circuit is designed to detect a lamp current.

11. An electronic ballast according to claim 10,
wherein the control circuit is formed as an application specific integrated circuit.

12. An electronic ballast according to claim 9, wherein the control circuit detects a lamp voltage.

* * * * *